(12) United States Patent
Ura

(10) Patent No.: US 8,164,284 B2
(45) Date of Patent: Apr. 24, 2012

(54) ELECTRIC POWER STEERING SYSTEM

(75) Inventor: Noritake Ura, Anjo (JP)

(73) Assignee: JTEKT Corporation, Osaka-shi (JP)

( * ) Notice: Subject to any disclaimer, the term of this patent is extended or adjusted under 35 U.S.C. 154(b) by 166 days.

(21) Appl. No.: 12/833,341

(22) Filed: Jul. 9, 2010

(65) Prior Publication Data

US 2011/0025244 A1 Feb. 3, 2011

(30) Foreign Application Priority Data

Jul. 28, 2009 (JP) .................................. 2009-175631

(51) Int. Cl.
*H02P 6/00* (2006.01)
(52) U.S. Cl. .............................. 318/400.01; 318/400.15
(58) Field of Classification Search .................. 318/432, 318/139, 434, 400.01, 400.15
See application file for complete search history.

(56) References Cited

U.S. PATENT DOCUMENTS

| 4,621,327 | A | 11/1986 | Dolph et al. |
| 6,407,524 | B1 * | 6/2002 | Endo et al. .................. 318/432 |
| 6,653,829 | B1 * | 11/2003 | Henry et al. ............. 324/207.21 |
| 7,188,702 | B2 * | 3/2007 | Takagi et al. ................. 180/446 |
| 7,240,761 | B2 * | 7/2007 | Nagase et al. ................ 180/443 |
| 2002/0177932 | A1 | 11/2002 | Kifuku et al. |
| 2006/0076182 | A1 | 4/2006 | Kifuku et al. |
| 2007/0236186 | A1 | 10/2007 | Patterson |
| 2008/0203958 | A1 * | 8/2008 | Suzuki .......................... 318/629 |
| 2008/0297077 | A1 * | 12/2008 | Kovudhikulrungsri et al. ....................... 318/400.02 |

FOREIGN PATENT DOCUMENTS

| EP | 0 896 422 A1 | 2/1999 |
| EP | 1 826 899 A1 | 8/2007 |
| JP | A-2001-128482 | 5/2001 |
| JP | 2006-331086 | 12/2006 |

OTHER PUBLICATIONS

Copending U.S. Appl. No. 12/828,527 to Ura, filed Jul. 1, 2010 (145718).
European Search Report for Corresponding European Patent Application No. 10170924.4, mailed on Sep. 28, 2010.
Extended Search Report issued in corresponding European Patent Application No. 10169240.8 dated Feb. 10, 2011.

* cited by examiner

*Primary Examiner* — Rina Duda
(74) *Attorney, Agent, or Firm* — Oliff & Berridge, PLC

(57) ABSTRACT

In an electric power steering system, an ECU 11 that controls the operation of the system includes three independent microcomputers 18$u$, 18$v$, 18$w$ that perform phase current feedback control with respect to the corresponding phases, so that sinusoidal current is applied to each phase of the motor 12 as a non-connected motor. Also, each of the microcomputers 18$u$, 18$v$, 18$w$ monitors a deviation of an actual current value from a phase current command value, with respect to each of two phases other than the corresponding phase, and determines that an abnormality occurs in the phase in question when the deviation exceeds a predetermined threshold value. When two of the microcomputers 18$u$, 18$v$, 18$w$ determine that the abnormality occurs in the remaining one phase, the ECU 11 confirms the determination that the phase in question is in an abnormal condition.

4 Claims, 4 Drawing Sheets

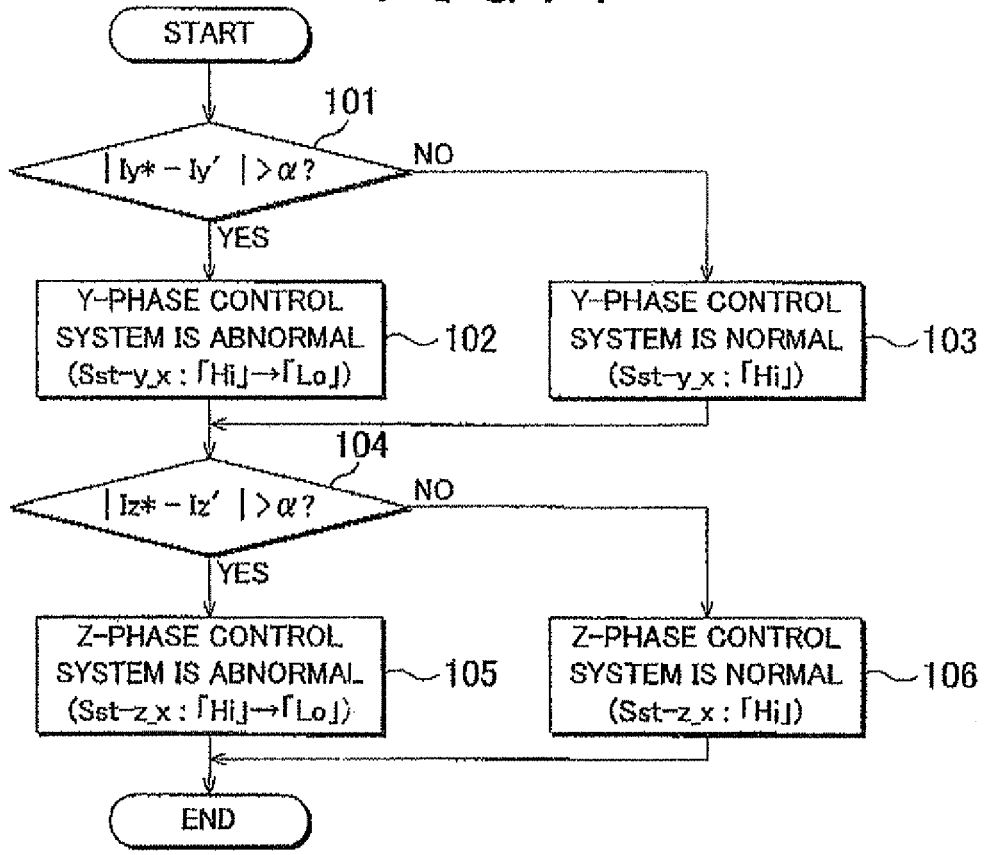

ELECTRIC POWER STEERING SYSTEM

INCORPORATION BY REFERENCE

The disclosure of Japanese Patent Application No. 2009-175631 filed on Jul. 28, 2009, including the specification, drawings and abstract, is incorporated herein by reference in its entirety.

BACKGROUND OF THE INVENTION

1. Field of the Invention

The invention relates to an electric power steering system.

2. Description of the Related Art

An electric power steering (EPS) system using a motor as a driving source has been proposed as one type of power steering systems for vehicles. The EPS system is characterized by a high degree of flexibility in the layout thereof and a small amount of energy consumption. In recent years, therefore, the electric power steering system has been increasingly employed in a wide variety of vehicle types, from compact vehicles to large vehicles.

In the EPS system, numerous abnormality determining operations (diagnostics) are performed in information processing equipment (such as a microcomputer) that performs power assist control of the EPS system. For example, the microcomputer includes CPU and memories (RAM and ROM), and various types of electronic circuits (such as A/D converters). Upon start-up of the microcomputer (i.e., when the ignition key is turned on), an initial check is conducted so as to check if a memory that provides a storage space for a program under execution and its work data is normal. See, for example, Japanese Patent Application Publication No. 2006-331086 (JP-A-2006-331086). After start-up, too, it is checked if the microcomputer and various electronic circuits under control of the microcomputer function normally. If any abnormality is detected in the abnormality determination process, a fail-safe action or measure is immediately taken so as to ensure high reliability and safety.

The BPS system is configured to perform various compensation controls in an attempt to achieve more excellent steering feeling, resulting in an increase in the capacity or storage of the memory and an increase in the time required for the initial check. Also, the function checks after start-up are conducted by a monitoring microcomputer provided independently of a microcomputer (main microcomputer) that implements power assist control. In this case, the main microcomputer has to carry out test computations sent from the monitoring microcomputer, in real time. Furthermore, the provision of new monitoring circuits (abnormality determination circuits), including the monitoring microcomputer, makes it necessary for the main microcomputer to check if the monitoring circuits function normally. Thus, the processing power required to perform the abnormality determination process keeps growing or increasing, which is a cause of increase in the manufacturing cost.

In addition, the provision of a large number of monitoring circuits leads to a significant increase in the failure rate due to an increase in the number of constituent elements of the system. Also, since abnormality determinations are made over a wide range of phenomena, even a trivial phenomenon, which would hardly affect the operation of the EPS system, may be determined as an abnormality. If such an abnormality is counted as a failure, the failure rate may be further raised or increased, as one example of problems caused by the provision of the monitoring circuits. In this respect, too, there is still room for improvement.

SUMMARY OF INVENTION

An object of the invention is to provide an electric power steering system that solves the above-described problems.

An electric power steering system according to one aspect of the invention has a steering force assist device that provides assist force for assisting a steering operation, to a steering system, using a motor as a driving source, and a controller that controls the operation of the steering force assist device. The controller includes a control signal generator that generates a motor control signal so as to produce a motor torque corresponding to the assist force, and a driving circuit that supplies driving electric power based on the motor control signal, to the motor. The control signal generator calculates a current command value corresponding to a target assist force, based on a detected steering torque, and performs a current feedback computation so as to create the motor control signal. The motor is a non-connected brushless motor in which motor coils of three phases are not connected to each other, and the controller includes three systems provided independently of one another with respect to each phase of the motor, each of the systems having the driving circuit and the control signal generator. Each of the control signal generators of the three systems converts a current command value of a two-phase coordinate system corresponding to the target assist force, into a phase current command value of each phase, so as to perform phase current feedback control with respect to the corresponding phase, and makes an abnormality determination based on a deviation of a phase current value from the phase current command value, with respect to each of the two phases other than the corresponding phase. When the control signal generators of two of the three phases determine that an abnormality occurs in the remaining one phase, the controller confirms the determination.

With the above arrangement, when some abnormality occurs in a control system of a certain phase, the abnormality appears in corresponding phase current command values calculated by the control signal generators, or corresponding phase current values of the motor generated through execution of the current feedback control. Accordingly, each of the control signal generators mutually monitors phase current deviations that appear in the phases other than the corresponding phase, so as to detect an abnormality that occurs in the phase(s) thus monitored. When two of the control signal generators both determine that an abnormality occurs in the remaining one phase, the controller confirms that the control system of the remaining phase is in an abnormal condition, thus assuring improved reliability.

In particular, when an abnormality that occurs in any of the control signal generators has an influence on power assist control, the abnormality appears in the form of a phase current deviation associated with the corresponding phase. Accordingly, other abnormality determination control concerning an electronic control unit that provides each control signal generator, such as an initial check of a memory upon start-up of the control unit as described above, may be eliminated, and may be replaced by the abnormality determination based on the current deviation in each phase. Consequently, not only the start-up time is reduced, but also cost reduction due to reduction of the processing power required of the control signal generators and reduction of the failure rate due to scale-down of relevant circuits can be achieved.

BRIEF DESCRIPTION OF DRAWINGS

The foregoing and further features and advantages of the invention will become apparent from the following description of example embodiments with reference to the accompanying drawings, wherein like numerals are used to represent like elements and wherein:

FIG. 4 is a flowchart illustrating the process of making a status determination on the other two phases; and FIG. 5 is an explanatory view indicating truth values of a status evaluator.

DETAILED DESCRIPTION OF EMBODIMENTS

One embodiment of the invention will be described with reference to the drawings.

Figure 1:
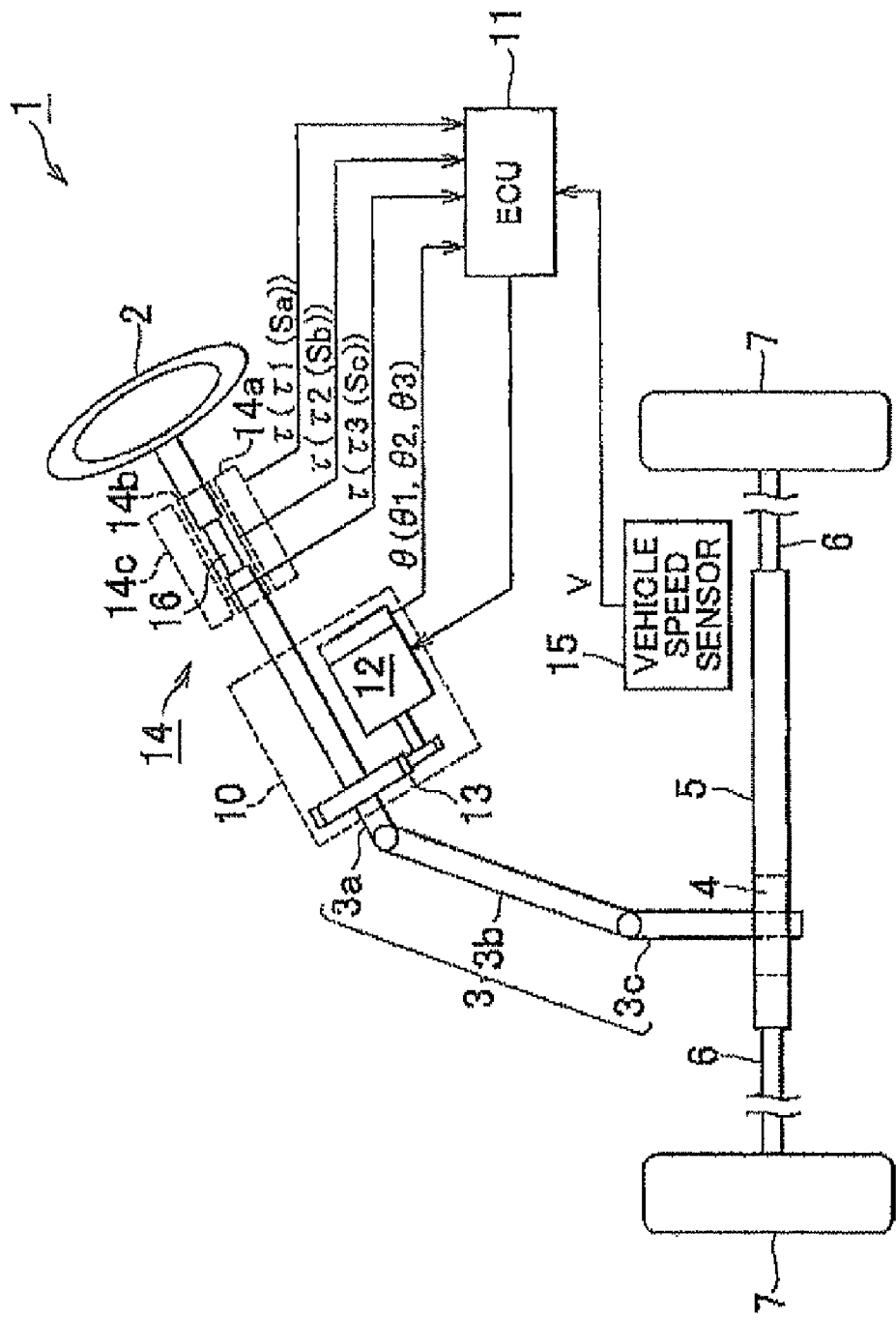
FIG. 1 is a schematic view showing the construction of an electric power steering (EPS) system.

As shown in FIG. 1, in an electric power steering (EPS) system 1 of this embodiment, a steering shaft 3 to which a steering wheel 2 is fixed is coupled to a rack shaft 5 via a rack-and-pinion mechanism 4, and rotation of the steering shaft 3 caused by a steering operation is converted into reciprocating linear motion of the rack shaft 5 by means of the rack-and-pinion mechanism 4. The steering shaft 3 includes a column shaft $3a$, an intermediate shaft $3b$, and a pinion shaft $3c$, which are coupled to each other. The reciprocating linear motion of the rack shaft 5 originating from the rotation of the steering shaft 3 is transmitted to knuckles (not shown) via tie rods 6 coupled to the opposite ends of the rack shaft 5, so as to change the turning angles of steerable wheels 7.

The EPS system 1 includes an EPS actuator 10 that serves as a steering force assist device for providing assist force to a steering system so as to assist in a steering operation, and an ECU 11 that serves as a controller for controlling the operation of the EPS actuator 10.

The EPS actuator 10 is configured as a column-assist-type EPS actuator in which a motor 12 as a driving source is operatively coupled to the column shaft $3a$ via a reduction gear 13. A known worm-and-wheel gear is employed as the reduction gear 13. The EPS actuator 10 is arranged to reduce the rotational speed of the motor 12, and transmit the resulting rotation to the column shaft $3a$, thereby to provide the motor torque as assist force to the steering system.

A torque sensor 14 and a vehicle speed sensor 15 are connected to the ECU 11. The torque sensor 14 includes a torsion bar 16 provided somewhere in the column shaft $3a$, and three independent sensor units $14a$, $14b$, $14c$ each capable of detecting a steering torque $\tau$ transmitted via the steering shaft 3, based on the torsion of the torsion bar 16. The sensor units $14a$, $14b$, $14c$ generate sensor signals (Sa, Sb, Sc) representative of the detected steering torques.

For example, the torque sensor may be formed by placing three Hall ICs, as the sensor units $14a$, $14b$, $14c$ serving as sensing elements, around a sensor core (not shown) that causes a change in the magnetic flux based on the amount of torsion of the torsion bar 16. See, for example, FIG. 10 in Japanese Patent Application Publication No. 2003-149062 (JP-A-2003-149062).

The ECU 11 controls assist torque generated by the motor 12 to which driving electric power is supplied, based on the steering torque $\tau$ ($\tau 1$, $\tau 2$, $\tau 3$) detected by the torque sensor 14 and the vehicle speed V detected by the vehicle speed sensor 15, so as to implement power assist control.

Next, an electrical arrangement of the EPS system of this embodiment will be described.

Figure 2:
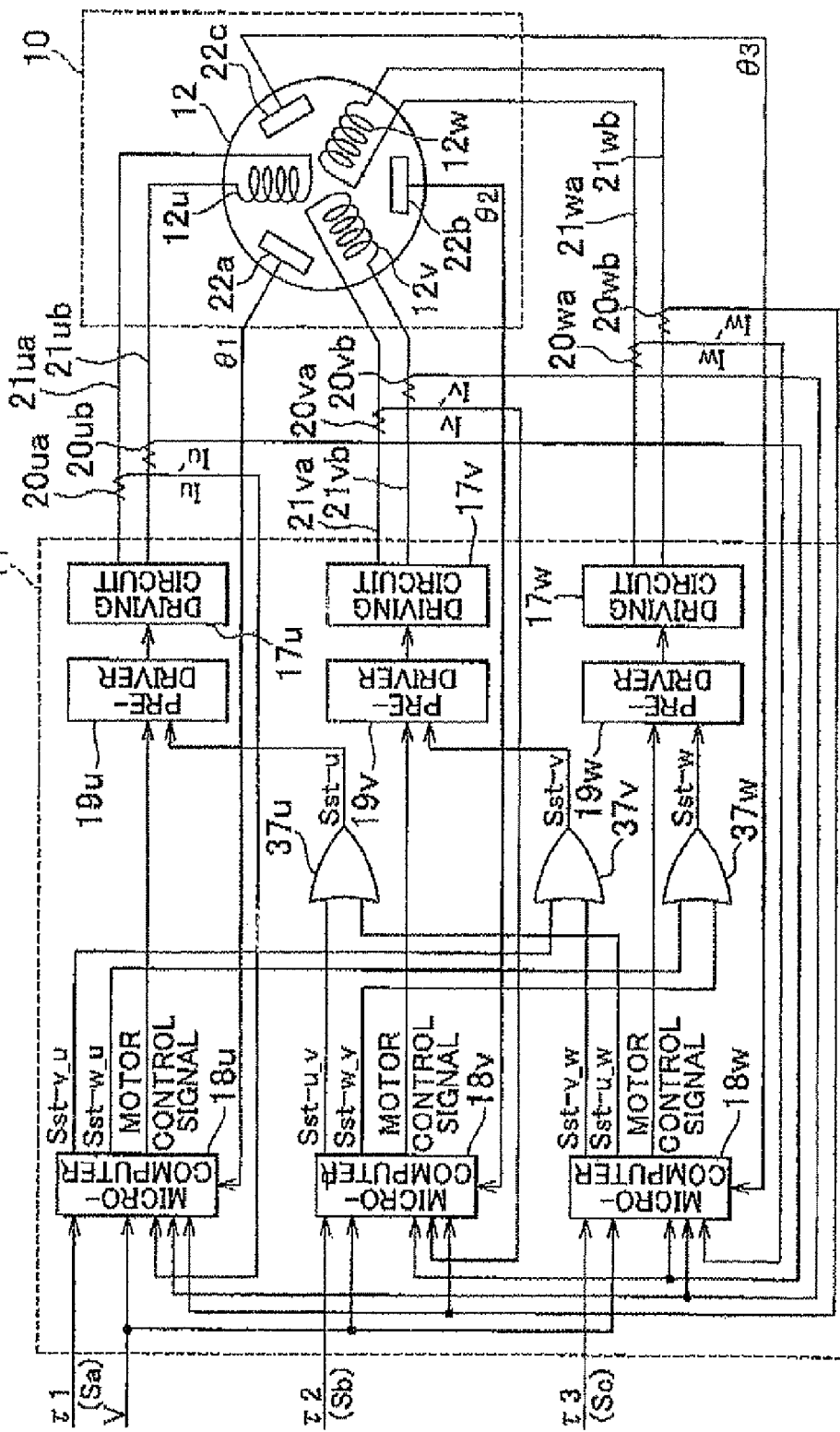
FIG. 2 is a block diagram showing an electrical arrangement of the EPS system.

As shown in FIG. 2, a non-connected brushless motor in which motor coils $12u$, $12v$, $12w$ of three phases (U, V, W) are not connected to each other is used as the motor 12 serving as the driving source of the BPS actuator 10. The ECU 11 is configured to supply three-phase driving electric power to the motor 12, by applying sinusoidal current to the motor coil $12u$, $12v$, $12w$ of each phase, independently of one another.

More specifically, the ECU 11 includes three driving circuits $17u$, $17v$, $17w$ separately provided for the motor coils $12u$, $12v$, $12w$ of the respective phases, and three microcomputers $18u$, $18v$, $18w$ that serve as control signal generators provided separately for the driving circuits $17u$, $17v$, $17w$, respectively. Pre-drivers $19u$, $19v$, $19w$ are interposed between the respective microcomputers $18u$, $18v$, $18w$ and the corresponding driving circuits $17u$, $17v$, $17w$. The driving circuits $17u$, $17v$, $17w$ operate independently of one another, based on motor control signals individually generated by the microcomputers $18u$, $18v$, $18w$, respectively, so that electric current is passed through the motor coil $12u$, $12v$, $12w$ of each of the above-indicated phases.

Each of the microcomputers $18u$, $18v$, $18w$ receives a sensor signal (Sa, Sb, Sc) generated by the torque sensor 14. Specifically, the microcomputer $18u$ receives a sensor signal Sa generated by the sensor unit $14a$, as one of the three sensor units $14a$, $14b$, $14c$ that constitute the torque sensor 14. Similarly, the microcomputer $18v$ receives a sensor signal Sb generated by the sensor unit $14b$, and the microcomputer $18w$ receives a sensor signal Sc generated by the sensor unit $14c$. Then, each of the microcomputers $18u$, $18v$, $18w$ detects the steering torque $\tau 1$, $\tau 2$, $\tau 3$, independently of one another, based on the sensor signal Sa, Sb, Sc received from the corresponding sensor unit $14a$, $14b$, $14c$. In the meantime, the microcomputers $18u$, $18v$, $18w$ receive a common value representing the vehicle speed V detected by the vehicle speed sensor 15, via an in-vehicle network (CAN: Controller Area Network).

In this embodiment, each of the microcomputers $18u$, $18v$, $18w$ calculates target assist force, namely, assist force to be applied to the steering system through execution of the power assist control, based on the above-indicated quantities ($\tau 1$, $\tau 2$, $\tau 3$, V) of state. Each of the microcomputers $18u$, $18v$, $18w$ calculates the target assist force, such that the target assist force becomes larger as the vehicle speed V is lower, and becomes larger as the steering torque is larger.

Also, the microcomputers $18u$, $18v$, $18w$ detect phase current values Iu, Iv, Iw of respective phases of the motor 12, independently of one another. Then, each of the microcomputers $18u$, $18v$, $18w$ independently performs phase current feedback control with respect to the corresponding phase, so as to create a motor control signal to be generated to a corresponding one of the driving circuits $17u$, $17v$, $17w$, thereby to produce motor torque corresponding to the target assist force.

More specifically, two current sensors for detecting current values Iu, Iv, Iw of each phase of the motor 12 are provided for each phase. The motor coil $12u$, $12v$, $12w$ of each phase and the corresponding driving circuit $17u$, $17v$, $17w$ are connected to each other by two power lines $21ua$, $21ub$, $21va$, $21vb$, $21wa$, $21wb$, respectively, and the current sensors $20ua$, $20ub$, 20va, 20vb, 20wa, 20wb are provided in a one-to-one correspondence with the power lines 21ua, 21ub, 21va, 21vb, 21wa, 21wb, respectively.

Each of the microcomputers 18u, 18v, 18w detects a phase current value of the corresponding phase, using a first current sensor (20ua, 20va, 20wa) provided in one of the power lines, as one of the two current sensors provided for the corresponding phase. Each of the microcomputers 18u, 18v, 18w also detects phase current values of two phases other than the corresponding phase, using second current sensors (20ub, 20vb, 20wb) each provided in the other power line.

Specifically, the microcomputer 18u corresponding to the U phase detects a phase current value Iu of the U phase as the corresponding phase, using the current sensor 20ua provided in the power line 21ua (the upper one of the two parallel power lines in FIG. 2), as one of the two power lines 21ua, 21ub that connect the driving circuit 17u corresponding to the U phase with the U-phase motor coil 12u. The microcomputer 18u also detects phase current values Iv', Iw' of the two phases, i.e., V phase and W phase, other than the corresponding phase, using the current sensors 20vb, 20wb respectively provided in the power lines 21vb, 21wb (each of which is the lower one of the two parallel power lines in FIG. 2) of the above-indicated two phases.

Similarly, each of the microcomputers 18v, 18w corresponding to the V phase and W phase, respectively, detects a phase current value Iv, Iw of the corresponding phase, using the current sensor 20va, 20wa provided in one of the power lines (the upper one of the two parallel power lines in FIG. 2) of the corresponding phase. With regard to the two phases other than the corresponding phase, the microcomputer 18v corresponding to the V phase detects phase current values Iu', Iw' of the U phase and W phase, using the current sensors 20ub, 20wb respectively provided in the power lines 21ub, 21wb (each of which is the lower one of the two parallel power lines in FIG. 2) of the phase and W phase. The microcomputer 18w corresponding to the W phase detects phase current values Iu', Iv' of the U phase and V phase, using the current sensors 20ub, 20vb respectively provided in the power lines 21ub, 21vb (each of which is the lower one of the two parallel power lines in FIG. 2) of the U phase and V phase.

Also, rotation angle sensors 22a, 22b, 22c that detect the rotation angle θ of the motor 12 independently of one another are connected to the ECU 11, and each of the microcomputers 18u, 18v, 18w detects the rotation angle θ (θ1, θ2, θ3) of the motor 12 by means of a corresponding one of the rotation angle sensors 22a, 22b, 22c (see FIG. 1). Specifically, the microcomputer 18u detects a rotation angle θ1 using the rotation angle sensor 22a, and the microcomputer 18v detects a rotation angle θ2 using the rotation angle sensor 22b, while the microcomputer 18w detects a rotation angle θ3 using the rotation angle sensor 22c.

Each of the microcomputers 18u, 18v, 18w performs phase current feedback control with respect to the corresponding phase, based on the respective phase current values In (Iu'), Iv (Iv'), Iw (Iw') of the motor 12 detected independently of one another, so as to create a motor control signal for producing motor torque corresponding to the target assist force.

Next, the process of performing a current feedback computation and generating a motor control signal in a control system of each phase, and applying electric current to each of the motor coils will be described.

For convenience in explanation, a given phase of the U, V, and W phases will be denoted as "X phase", and the steering torque and motor rotation angle used in the control system of the X phase will be denoted as "τn", "θn" (n=1, 2, 3), respectively. Where the X phase represents the corresponding phase, the two phases other than the corresponding phase will be denoted as "Y phase" and "Z phase", respectively.

In the case where the U phase is denoted as the X phase, for example, the steering torque τn and rotation angle θn of the motor 12 detected by the microcomputer 18x will be denoted as "τ1", "θ1", respectively. One of the two phases other than the U phase, i.e., the V phase and the W phase, will be denoted as "Y phase", and the other phase will be denoted as "Z phase".

Figure 3:
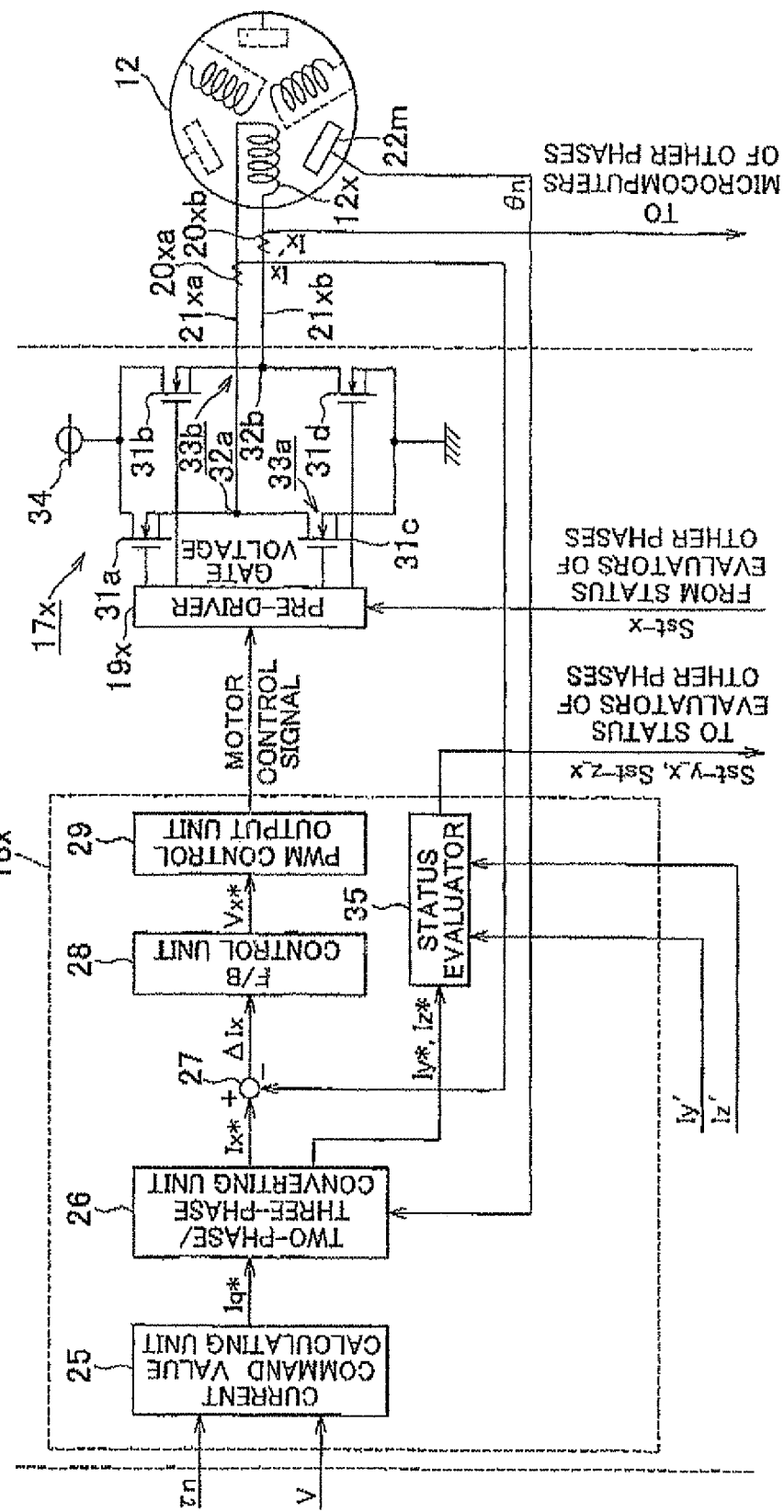
FIG. 3 is a block diagram schematically showing the configuration of a control system of each phase.

As shown in FIG. 3, the microcomputer 18x has a current command value calculating unit 25, and the current command value calculating unit 25 calculates the target assist force, based on the steering torque τn and the vehicle speed V. The current command value calculating unit 25 is configured to generate a q-axis current command value Iq* of a d/q, coordinate system, as a current command value of a two-phase coordinate system corresponding to the target assist force.

In this connection, the three-phase alternating current is converted into d-axis current and q-axis current, through coordinate conversion on rectangular coordinates of d-axis and q-axis. Thus, the three-phase alternating current can be treated as two amounts of direct current, i.e., d-axis current and q-axis current, and the motor torque depends on the q-axis current value, as one of the two direct current values. It is thus possible to generate motor torque corresponding to the target assist force, through execution of current feedback control based on the q-axis current command value Iq*.

In the ECU 11, the microcomputers 18u, 18v, 18w perform phase current feedback control with respect to the corresponding phases, independently of one another, so as to generate motor control signals to the corresponding driving circuits 17u, 17v, 17w, as described above. To this end, the current command value calculating unit 25 of the microcomputer 18x initially generates the q-axis current command value Iq* to a two-phase/three-phase converting unit 26, which also receives the rotation angle θn of the motor 12 detected by the rotation angle sensor 22m corresponding to the X phase (where m=a, b, c, corresponding to "n"). Then, the two-phase/three-phase converting unit 26 performs coordination conversion on the q-axis current command value Iq* and the d-axis current command value Id* (Id*=0), so as to create a phase current command value Ix* of the X-phase as the corresponding phase.

Through the coordinate conversion performed by the two-phase/three-phase converting unit 26, phase current command values Iy*, Iz* of the two phases other than the corresponding phase, as well as the phase current command value Ix* of the corresponding phase, are calculated. In this embodiment, the phase current command values Iy*, Iz* of these two phases are used in a status determining unit 35 which will be described later.

Then, the phase current command value Ix* calculated by the two-phase/three-phase converting unit 26 is transmitted to a subtracter 27. The subtracter 27 also receives the actual phase current value Ix detected by the current sensor 20xa provided in the power line 21x as one of the power lines that connect the X-phase motor coil 12x with the driving circuit 17x. Meanwhile, other microcomputers (not shown) corresponding to the other two phases receive the phase current value Ix' detected by the current sensor 20xb provided in the other power line 21xb. The subtracter 27 calculates a deviation ΔIx of the phase current command value Ix* from the phase current value Ix, and generates the deviation ΔIx to a F/B control unit 28, so that current feedback control is carried out so as to cause the actual phase current value Ix to follow the phase current command value Ix*.

Specifically, the F/B control unit 28 performs proportional integral control (PI control), based on a proportional term obtained by multiplying the deviation ΔIx received from the subtracter 27 by a proportional gain, and an integral term obtained by multiplying an integral value of the deviation by an integral gain. The F/B control unit 28 generates a phase current command value Vx* calculated through the feedback control computation, to a PWM control output unit 29, and the PWM control output unit 29 calculates a duty command value corresponding to the phase voltage command value Vx*, so as to create a motor control signal with respect to the X phase.

In the driving circuit 17x, a series circuit of a pair of FETs 31a, 31c and a series circuit of a pair of FETs 31b, 31d are connected in parallel with each other, and a connection point of the FETs 31a, 31c and a connection point of the FETs 31b, 31d provide output terminals 32a, 32b, respectively.

Namely, the driving circuit 17x is configured as a known H-bridge-type PWM inverter in which two switching arms 33a, 33b each having a pair of switching devices connected in series, as a basic unit, are connected in parallel with each other.

By turning on/off each of the FETs 31a to 31d through application of a voltage to a gate terminal thereof, a voltage originating from the power supply voltage of a battery 34 is applied to motor terminals connected to the output terminals 32a, 32b, so that the direction in which current is passed through the motor 12 and the amount of the current passed through the motor 12 can be changed as desired.

More specifically, the motor control signal is generated from the microcomputer 18x to the pre-driver 19x, and the pre-driver 19x applies gate voltages to the respective FETs 31a to 31d that constitute the driving circuit 17x, based on the motor control signal. As a result, the output voltage across the output terminals 32a, 32b changes in accordance with the duty ratio represented by the motor control signal, so that sinusoidal current is applied to the motor coil 12x of the corresponding X phase.

For each of the U, V, W phases, the phase current feedback control as described above is carried out so as to generate the motor control signal and apply sinusoidal current to the motor coil of the corresponding phase, so that the motor is driven to produce motor torque corresponding to the target assist torque.

Next, the manner of detecting an abnormality in the EPS system of this embodiment will be described.

As shown in FIG. 3, the microcomputer 18x is provided with the status determining unit 35, and the status determining unit 35 receives phase current command values Iy*, Iz* of two phases other than the corresponding phase, out of the phase current command values calculated through coordinate conversion by the two-phase/three-phase converting unit 26. The status determining unit 35 also receives phase current values Iy', Iz' of the two phases other than the corresponding phase. The status determining unit 35 executes abnormality determinations about the control systems of the two phases other than the corresponding phase, i.e., the control systems of the Y phase and Z phase, based on a deviation of the phase current value Iy' from the phase current command values Iy* and a deviation of the phase current value Iz' from the phase current command value Iz*, respectively.

As described above, the ECU 11 includes three driving circuits 17u, 17v, 17w, pre-drivers 19u, 19v, 19w, and microcomputers 18u, 18v, 18w, which are provided independently for the U, V and W phases, respectively, of the motor 12 (see FIG. 2). Also, each of the microcomputers 18u, 18v, 18w independently detects the steering torque τ (τ1, τ2, τ3), and the phase current values Iu (Iu'), Iv (Iv'), Iw (Iw') and rotation angle θ (θ1, θ2, θ3) of the motor 12. The microcomputers 18u, 18v, 18w perform phase current feedback control with respect to the corresponding phases, independently of one another, to thus form three independent control systems for the corresponding phases, respectively.

Accordingly, if the control system of each phase functions normally, each of the quantities of state (steering torque, each-phase current value, and motor rotation angle) detected by the microcomputers 18u, 18v, 18w has substantially the same value, and each of the phase current command values (Iu*, Iv*, Iw*) calculated separately by the microcomputers 18u, 18v, 18w also has substantially the same value.

If an abnormality occurs in the control system of a given phase, on the other hand, the abnormality appears in the corresponding phase current command values calculated by the microcomputers 18u, 18v, 18w, or the corresponding phase current values of the motor 12 generated through execution of the current feedback control. Accordingly, the abnormality that occurs in the control system of the given phase can be detected by causing the microcomputers of the other two phases to monitor deviations of the phase current values from the phase current command values.

Thus, the EPS system 1 of this embodiment is configured to make an abnormality determination on each of the control systems of the U, V, and W phases, by causing the status determining unit 35 provided in each of the microcomputers 18u, 18v, 18w to mutually monitor phase current deviations regarding the other two phases, such that an abnormality in one of the control systems can be detected by the microcomputers (status determining units) of the other two control systems.

More specifically, as shown in the flowchart of FIG. 4, the microcomputer 18x initially determines whether an absolute value of a deviation of the phase current value Iy' from the phase current command value Iy* of the Y phase exceeds a predetermined threshold value α (step 101). When the deviation (|Iy*−Iy'|) exceeds the threshold value α (|Iy*−Iy'|>α, YES in step 101), it is determined that any abnormality occurs in the Y-phase control system (step 102).

If it is determined in step 101 that the deviation (|Iy*−Iy'|) is equal to or smaller than the threshold value α (|Iy*−Iy'|≦α, NO in step 101), it is determined that the Y-phase control system is in a normal condition (step 103).

Then, the microcomputer 18x determines whether an absolute value of a deviation of the phase current value Iz' from the phase current command value Iz* of the Z phase exceeds a predetermined threshold value α (step 104). If the deviation (|Iz*−Iz'|) exceeds the threshold value α (|Iz*−Iz'|>α, YES in step 104), it is determined that any abnormality occurs in the Z-phase control system (step 105).

If it is determined in step 104 that the deviation (|Iz*−Iz'|) is equal to or smaller than the threshold value α (Iz*−Iz'|≦α, NO in step 104), it is determined that the Z-phase control system is in a normal condition (step 106).

When two of the microcomputers 18u, 18v, 18w determine that an abnormality occurs in the control system of the remaining one phase, the ECU 11 confirms the determination that the control system of this phase is in an abnormal condition. Then, the ECU 11 is arranged to stop application of current to the phase on which the abnormality is confirmed.

More specifically, as shown in FIG. 2, each of the microcomputers 18u, 18v, 18w generates the results of abnormality determinations made in its status determining unit 35 as status signals (Sst-v_u, Sst-w_u, Sst-u_v, Sst-w_v, Sst-u_w, Sst-v_w). Also the ECU 11 is provided with three independent status evaluators 37u, 37v, 37w corresponding to the respective phases, and each of the status evaluators 37u, 37v, 37w receives status signals generated by the microcomputers of the two phases other than the corresponding phase.

The U-phase status evaluator 37u receives status signals Sst-u_v, Sst-u_w representing the status of the U-phase control system, from the microcomputers 18v, 18w corresponding to the V phase and the W phase, respectively. Similarly, the V-phase status evaluator 37v receives status signals Sst-v_u, Sst-v_w representing the status of the V-phase control system, from the microcomputers 18u, 18w corresponding to the U phase and the W phase, and the W-phase status evaluator 37w receives status signals Sst-w_u, Sst-w_v representing the status of the W-phase control system, from the microcomputers 18u, 18v corresponding to the U phase and the V phase. Each of the status evaluators 37n, 37v, 37w confirms the determination that an abnormality occurs in the corresponding phase only when both of the two status signals received by the status evaluator indicate the occurrence of the abnormality in the corresponding phase.

If, on the other hand, at least one of the two status signals each of the status evaluators 37u, 37v, 37w receives from the microcomputers other than that of the corresponding phase indicates that the control system of the corresponding phase is in a normal condition, the status evaluator 37u, 37v, 37w confirms the determination that the control system of the corresponding phase is in a normal condition.

The status evaluators 37u, 37v, 37w generate the results of status determinations confirmed as described above, as confirmed status signals Sst-u, Sst-v, Sst-w, to the pre-drivers 19u, 19v, 19w of the corresponding phases, respectively. Each of the pre-chillers 19u, 19v, 19w is configured to stop application of gate voltages to the respective FETs a1a to 31d (see FIG. 3) that constitute the corresponding driving circuit 17u, 17v, 17w when the confirmed status signal Sat-n, Sst-v, Sst-w received by the pre-driver 19u, 19v, 19w indicates that an abnormality occurs in the phase in question corresponding to the pre-driver 19u, 19v, 19w.

Specifically, when the control system of the phase to be evaluated is in a normal condition, corresponding ones of the status signals Sst-v_u, Sst-w_u, Sst-u_v, Sst-w_v, Sst-u_w, Sst-v_w generated by the microcomputers 18u, 18v, 18w are set to "Hi", as shown in FIG. 4. When the control system of the phase to be evaluated is in an abnormal condition, the corresponding status signals are set to "Lo", as shown in FIG. 4. Furthermore, each of the status evaluators 37u, 37v, 37w is formed by an OR circuit.

As shown in FIG. 5, if the two status signals Sst-x_y, Sst-x_z concerning the corresponding phase (X phase), which are received from the two phases (Y phase, W phase) other than the corresponding phase, are both "Hi", or one of the two status signals is "Hi", the confirmed status signal Sst-x generated by the status evaluator corresponding to the X phase is set to "Hi". Only when the two status signals Sst-x_y, Sst-x_z received from the above two phases are both "Lo", the confirmed status signal Sst-x generated by the status evaluator corresponding to the X phase is set to "Lo".

The pre-driver 19x of this embodiment is configured to operate in a so-called "Hi active" mode in which the pre-driver 19x applies gate voltages to the FETs of the corresponding driving circuit, based on the motor control signal as described above, when the confirmed status signal Sst-x received by the pre-driver 19 is "Hi".

Namely, the pre-driver 19x provides a stopper that stops application of gate voltages when the confirmed status signal Sst-x received is "Hi". When the pre-driver 19x stops applying the gate voltages to the FETs 31a to 31d that constitute the driving circuit 17x of the corresponding phase, all of the FETs 31a to 31d are turned off (see FIG. 3). Thus, a fail-safe action is immediately taken by stopping application of electric current to the phase in which the abnormality occurs, while allowing current to continue to be applied to the remaining two phases, so that the power assist control is continued.

The embodiment as described above provides the following effects.

1) In the ECU 11, the microcomputers 18u, 18v, 18w perform phase current feedback control with respect to the corresponding phases, independently of one another, so as to apply sinusoidal current to each phase of the motor 12 in which the motor coils are not connected to each other. Each of the microcomputers 18u, 18v, 18w also monitors a deviation of the actual current value from the phase current command value, with respect to each of the two phases other than the corresponding phase, and determines that an abnormality occurs in the phase subjected to monitoring if the deviation exceeds the predetermined threshold value. If two of the microcomputers 18u, 18v, 18w determine that an abnormality occurs in the remaining one phase, the ECU 11 confirms the determination that the control system of this phase is in an abnormal condition.

With the above arrangement, when some abnormality occurs in the control system of a given phase, the abnormality appears in the corresponding phase current command values calculated by the microcomputers 18u, 18v, 18w, or the corresponding phase current values of the motor 12 generated through execution of the current feedback control. Thus, each of the microcomputers 18u, 18v, 18w mutually monitors phase current deviations that appear in the phases other than the corresponding phase, so as to detect an abnormality that occurs in the phase(s) thus monitored. When two of the microcomputers 18u, 18v, 18w both determine that an abnormality occurs in the remaining one phase, the ECU 11 confirms the determination about the abnormality in the remaining phase, thus assuring high reliability.

In particular, when an abnormality that occurs in any of the microcomputers 18u, 18v, 18w has an influence on the power assist control, the abnormality reliably appears in the form of a phase current deviation associated with the corresponding phase. Accordingly, other abnormality determination control (monitoring circuit) concerning the microcomputers 18u, 18v, 18w, such as an initial check of a memory upon start-up of the system as described above, may be eliminated, and may be replaced by the abnormality determination based on the current deviation in each phase. Consequently, not only the start-up time is reduced, but also cost reduction due to reduction of the processing power required of the microcomputers 18u, 18v, 18w and reduction of the failure rate due to scale-down of relevant circuits can be achieved.

2) When the ECU 11 confirms the determination that the control system of a given phase is in an abnormal condition, the ECU 11 stops only the application of electric current to the phase in which the abnormality was confirmed, and continues to apply current to the remaining two phases.

The brushless motor is able to be driven by two-phase current application. In the non-connected motor in which the motor coils are not connected to each other, even when an abnormality occurs in any one of the three phases, the abnormality does not affect or impede application of current to the remaining two phases. Thus, the above arrangement in which only the application of current to the phase in which the abnormality occurs is stopped makes it possible to continue the power assist control while taking an appropriate fail-safe action, thus achieving both high reliability and improved convenience of the driver.

3) The ECU 11 is provided with three independent status evaluators 37u, 37v, 37w corresponding to the respective phases, and each of the microcomputers 18u, 18v, 18w generates status signals (Sst-v_u, Sst-w_u, Sst-u_v, Sst-w_v, Sst-u_w, Sst-v_w) representing the results of abnormality determinations on the two phases other than the corresponding phase, to the status evaluators of the other two phases. If both of the two status signals received from the microcomputers of the two phases other than the corresponding phase indicate that the control system of the corresponding phase is in an abnormal condition, the status evaluator 37u, 37v, 37w receiving these status signals generates a confirmed status signal Sst-u, Sst-v, Sst-w indicating that the control system of the corresponding phase is in an abnormal condition, to the corresponding pre-driver. If the confirmed status signal received by the pre-driver 19u, 19v, 19w indicates that the control system of the corresponding phase is in an abnormal condition, the pre-driver 19u, 19v, 19w stops applying gate voltages to the corresponding driving circuit 17u, 17v, 17w.

With the above arrangement, the ECU 11 having a simple configuration is able to continue applying electric current to the remaining two phases while stopping application of current to the phase in which an abnormality occurs. If another abnormality occurs in the remaining two phases, application of current to all of the phases can be stopped.

4) Each of the status evaluators 37u, 37v, 37w is formed by an OR circuit. Namely, the status signals Sst-y_x, Sst-z_x generated by the microcomputer 18x are set to be "Hi" when the signals represent normal conditions, and the pre-driver 19x is arranged to apply gate voltages to the corresponding driving circuit when the confirmed status signal Sst-x received from the corresponding status evaluator is "Hi" (i.e., the pre-driver 19x becomes active in response to "Hi"). Thus, each status evaluator can be easily formed as an OR circuit, and the configuration of the status evaluator can be further simplified.

5) The EPS system 1 includes the first current sensor (20xa) used by the microcomputer 18x for detecting the phase current value Ix of the X phase as the corresponding phase, and the second current sensor (20xb) used by the microcomputers of the other phases for detecting the phase current value Ix' of the X phase.

With the above arrangement, when an abnormality occurs in a portion of the system (each current sensor and its signal line) in the stage of detecting phase current values, a difference arises between the phase current value of the phase in question detected by the microcomputer of the phase in which the abnormality occurs, and the phase current value of the phase in question (in which the abnormality occurs), which is detected by the other two microcomputers. As a result, the abnormality is more likely to appear in the form of a current deviation, as compared with the case where the microcomputers 18u, 18v, 18w use a common value as the phase current value, so that the abnormality can be detected at an earlier opportunity, thus assuring improved reliability.

6) The first and second current sensors (20xa, 20xb) are respectively provided in the two power lines 21xa, 21xb that connect the motor coil 12x of each phase with the driving circuit 17x corresponding to the motor coil 12x.

With the above arrangement, an abnormality that occurs in any of the power lines 21xa, 21xb appears in the form of a phase current deviation, thus assuring a further simplified arrangement and improved reliability.

7) The ECU 11 receives sensor signals Sa, Sb, Sc of three independent systems capable of detecting the steering torque; and the microcomputers 18u, 18v, 18w detect the steering torques $\tau 1, \tau 2, \tau 3$, independently of one another, based on the corresponding sensor signals Sa, Sb, Sc. Then, each of the microcomputers 18u, 18v, 18w independently calculates a target assist force based on the steering torque $\tau 1, \tau 2, \tau 3$, and calculates a q-axis current command value Iq* corresponding to the target assist force.

With the above arrangement, when an abnormality occurs in a portion of the system (torque sensor and its signals) in the stage of detecting the steering torque $\tau$, a difference arises between the current command value based on the target assist force calculated by the microcomputer of the phase in which the abnormality occur, and the current command values calculated by the microcomputers of the other two phases. As a result, the abnormality is more likely to appear in the form of a current deviation, as compared with the case where the microcomputers 18u, 18v, 18w use a common value as the steering torque, so that the abnormality can be detected at an earlier opportunity, thus assuring further improved reliability.

8) The torque sensor 14 has the torsion bar 16 provided somewhere in the column shaft 3a, and three independent sensor units 14a, 14b, 14c each operable to detect the amount of torsion of the torsion bar 16, i.e., the steering torque $\tau$ transmitted via the steering shaft 3, and generate a sensor signal Sa, Sb, Sc representing the detected steering torque.

Thus, the mechanical arrangement of the torque sensor including the torsion bar is highly likely to be extremely rugged. The use of the torque sensor 14 in which only the electrical arrangement has a triple system makes it possible to simplify the arrangement while assuring sufficiently high reliability.

The above-described embodiment may be modified as follows.

In the above-described embodiment, the invention is embodied as a column assist type EPS system. However, the invention is not limitedly applied to the EPS system of this type, but may be embodied as a pinion assist type or rack assist type EPS system.

In the above-described embodiment, the first current sensor (20xa) used by the microcomputer 18x for detecting the phase current value Ix of the X phase as the corresponding phase, and the second current sensor (20xb) used by the microcomputers of the other phases for detecting the phase current value Ix' of the X phase are provided. However, the invention is not limited to this arrangement, but the microcomputers 18u, 18v, 18w may use common Values as respective phase current values Iu, Iv, Iw.

When the first and second current sensors (20xa, 20xb) as described above are provided, the current sensors are not necessarily provided in the two power lines 21xa, 21xb, respectively, of each phase. Even in the case where the current sensors are not provided in the two power lines, respectively, each of the microcomputers is able to perform current feedback control for each phase, and detect an abnormality based on a phase current deviation.

However, it is preferable to provide the first and second current sensors as described above, from the viewpoint of making an abnormality determination with higher reliability and higher accuracy. Thus, the first and second current sensors are preferably provided in the two power lines 21xa, 21xb, respectively, of each phase.

In the above-described embodiment, the torque sensor 14 including the three independent sensor units 14a, 14b, 14c operable to detect the steering torque $\tau$ and generate sensor signals Sa, Sb, Sc, respectively, is used, and the microcomputers 18*u*, 18*v*, 18*w* detect the steering torques τ1, τ2, τ3, independently of one another, based on the corresponding sensor signals Sa, Sb, Sc. However, the invention is not limited to this arrangement, but three independent torque sensors may be provided, and may be arranged to generate respective signals to the corresponding microcomputers. Also the microcomputers 18*u*, 18*v*, 18*w* may use a common value as the steering torque provided that the torque can be detected with sufficiently high reliability. Similarly, the microcomputers 18*u*, 18*v*, 18*w* may use a common value as the rotation angle θ of the motor 12.

In the above-described embodiment, the status signals Ssty_x, Sst-z_x generated by the microcomputer 18*x* are set to be "Hi" when the signals indicate normal conditions, and the pre-driver 19*x* is arranged to apply gate voltages to the corresponding driving circuit when the confirmed status signal Sst-x received is "Hi" (i.e., the pre-driver 19*x* becomes active in response to "Hi"). Also, each of the status evaluators 37*u*, 37*v*, 37*w* is formed by an OR circuit.

However, the invention is not limited to the above arrangement, but the status signal may be set to be "Lo" when it indicates that the control system of the phase in question is in a normal condition, and the pre-driver may become active in response to "Lo". Namely, each of the status evaluators is not limited to an OR circuit, but may be otherwise configured to generate a confirmed status signal indicating that the control system of the corresponding phase is in an abnormal condition, to the corresponding pre-driver, when both of the two status signals received indicate that the control system of the corresponding phase is in an abnormal condition. Accordingly, where a status signal indicative of an abnormal condition is "Hi", and a confirmed status signal indicative of an abnormal condition is "Hi", the status evaluator may be configured as an AND circuit.

In the above-described embodiment, when the ECU 11 confirms a determination that the control system of a certain phase is in an abnormal condition, the ECU 11 stops current application to the phase with respect to which the abnormality was confirmed, and continues current application to the remaining two phases. However, the invention is not limited to this arrangement, but the ECU 11 may be configured to stop current application to each of the phases of the motor 12, namely, stop supply of driving electric power to the motor 12. In this case, during a period of transition to stop of the supply of the driving electric power, control for gradual changes may be introduced, for example, the amounts of current applied to the remaining two phases may be gradually reduced.

In the above-described embodiment, the current command value calculating unit 25 calculates the q-axis current command value Iq* as the current command value of the two-phase coordinate system corresponding to the target assist fore; and subsequent two-phase/three-phase conversion is performed assuming that the d-axis current command value is "0". However, the invention is not limited to this arrangement, but the current command value calculating unit 25 may be configured to calculate the q-axis current command value and the d-axis current command value, as current command values of the two-phase coordinate system corresponding to the target assist force.

Next, technical ideas that can be grasped from the above-described embodiment, along with theft effects, will be described.

1) In the electric power steering system, the first current sensor used by the control signal generator of the phase in question for detecting the phase current, and the second current sensor used by the control signal generators of the two phases other than the phase in question are provided for each phase.

With the above arrangement, when an abnormality occurs in a portion of the system (each current sensor and its signal line) in the stage of detecting the phase current value, a difference arises between the phase current value of the phase in question, which is detected by the control signal generator of the phase in which the abnormality occurs, and the phase current values of the phase in which the abnormality occurs, which are detected by the control signal generators of the other two phases. As a result, the abnormality is more likely to appear in a current deviation, as compared with the case where the control signal generators use a common value as the phase current value, so that the abnormality can be detected at an earlier opportunity, thus assuring further improved reliability.

2) In the electric power steering system as described above at 1), the current sensors are provided in the two power lines, respectively, which connect the motor coil of each phase with the driving circuit corresponding to the motor coil.

With this arrangement, an abnormality that occurs in each power line also appears as a phase current deviation, thus assuring a further simplified arrangement and improved reliability.

3) in the power steering system as described above at 1) or 2), the controller receives sensor signals of three independent systems each capable of detecting the steering torque, and each of the control signal generators calculates the current command value, independently of one another, based on the steering torque detected based on the corresponding one of the sensor signals.

With the above arrangement, when au abnormality occurs in a portion of the system (the torque sensor and its signals) in the stage of detecting the steering torque, a difference arises between the current command value based on the target assist force calculated by the control signal generator of the phase in which the abnormality occurs, and the current command values calculated by the control signal generators of the other two phases. As a result, the abnormality is more likely to appear in a current deviation, as compared with the case where the control signal generators use a common value as the steering torque, so that the abnormality can be detected at an earlier opportunity, thus assuring further improved reliability.

4) In the electric power steering system as described above at 3), the torque sensor is adapted to generate sensor signals of three independent systems each capable of detecting the steering torque based on the amount of torsion of the torsion bar provided in the steering shaft. Namely, the mechanical arrangement of the torque sensor including the torsion bar is highly likely to be rugged. Thus, the use of the torque sensor in which only the electrical arrangement has a triple system makes it possible to simplify its arrangement or construction, while assuring sufficiently high reliability.

What is claimed is:
1. An electric power steering system comprising:
a steering force assist device that provides assist force for assisting a steering operation, to a steering system, using a motor as a driving source; and
a controller that controls the operation of the steering force assist device, wherein
the controller includes
a control signal generator that generates a motor control signal so as to produce a motor torque corresponding to the assist force, and a driving circuit that supplies driving electric power based on the motor control signal, to the motor, wherein the control signal generator calculates a current command value corresponding to a target assist force, based on a detected steering torque, and performs a current feedback computation so as to create the motor control signal, wherein the motor is a non-connected brushless motor in which motor coils of three phases are not connected to each other, wherein the controller includes three systems provided independently of one another with respect to each phase of the motor, each of the systems having the driving circuit and the control signal generator, wherein each of the control signal generators of the three systems converts a current command value of a two-phase coordinate system corresponding to the target assist force, into a phase current command value of each phase, so as to perform phase current feedback control with respect to the corresponding phase, and executes an abnormality determination based on a deviation of a phase current value from the phase current command value, with respect to each of the two phases other than the corresponding phase, and wherein when the control signal generators of two of the three phases determine that an abnormality occurs in the remaining one phase, the controller confirms the determination.

2. The electric power steering system according to claim 1, wherein when the controller confirms a determination that an abnormality occurs in one of the three phases, the controller stops only application of electric current to the phase in which the abnormality occurs, and continues to apply current to the remaining two phases.

3. The electric power steering system according to claim 2, wherein each of the control signal generators generates results of abnormality determinations concerning two phases other than the corresponding phase, as status signals, and wherein the controller has a status evaluator and a stopper for each phase, the status evaluator generating a confirmed status signal indicative of an abnormality in the phase in question when the status evaluator receives the two status signals concerning the phase in question, both of which indicate that the phase in question is in an abnormal condition, the stopper being operable to stop application of current to the phase in question when the confirmed status signal indicates the abnormality in the phase in question.

4. The electric power steering system according to claim 3, wherein each of the driving circuits applies current to the motor coil of the corresponding phase when gate voltages based on the motor control signal are applied to the driving circuit, and wherein the controller has a pre-driver provided for each phase, for applying the gate voltages to the driving circuit of the corresponding phase when the confirmed status signal indicates that the corresponding phase is in a normal condition.

* * * * *